Patented July 29, 1941

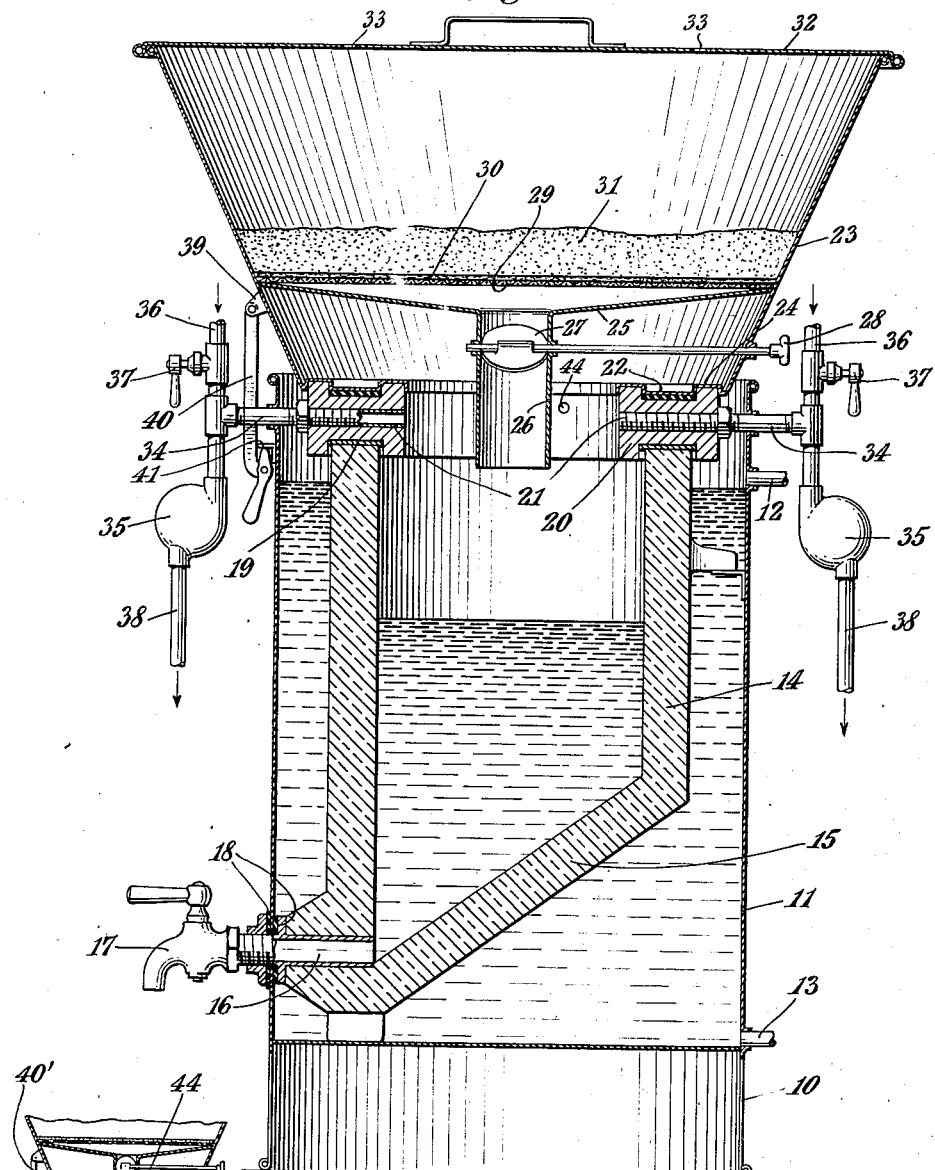

2,250,858

UNITED STATES PATENT OFFICE 2,250,858

BEVERAGE MAKING DEVICE

Joseph B. Ducat, Jamaica, N. Y.

Application November 28, 1939, Serial No. 306,452

6 Claims. (Cl. 53—3)

This invention relates broadly to beverage making machines, and especially to what is known commercially as percolators, and which device is particularly designed for the production of beverages on a large scale.

Beverage making apparatus for producing coffee, tea and similar hot drinks are in general use, and their operation and function is quite well-known. The present invention especially deals with a beverage-making device designed for the production of coffee, but may of course be used for producing beverages from other products, such as tea or the like.

The prime object of the present device is to provide a highly efficient machine of this kind by means of which coffee may be produced relatively quickly in large quantities, but in addition, of an exceptionally fine quality.

A further object of the present invention is to produce a device whereby a substantial gain in quantity of the ultimate product is obtained, without affecting the quality of the beverage.

The foregoing and still further important objects and advantages of my device will become more fully apparent from the accompanying drawing and the ensuing description thereof, which will bring out the salient points of my invention.

Heretofore, devices intended for brewing coffee in relatively large quantities usually consisted of a beverage container, upon which reposed a filter vessel, in which coffee ground was supported by a strainer or filter in such a way that hot water, or hot water and steam under pressure, was passed through the coffee ground into the beverage container, from which latter the ready beverage would be discharged.

With a few exceptions most of the so-called coffee urns have no provisions for accelerating the production of the beverage or for thoroughly extracting the water from the coffee ground in the production of such beverage.

Furthermore, very little attention has been devoted to the beverage containing vessel, especially from the standpoint of preventing the formation of residues or deposits developed during the process of beverage making, and which residues of one beverage operation left within the machine will impair the good quality of the beverage produced by the next following operation.

One of the important advantages of the present invention consists in the construction of the device in such a way that the beverage containing vessel will prevent the formation of a residue deposit, or minimise the formation of such deposit to such an extent that it may be considered negligent.

Another advantage of my device resides in its construction and function, whereby a relatively large gain in the quantity of the produced beverage is assured, as compared with the quantity of beverage produced in heretofore employed devices of the same volume or capacity.

I have found by actual experimentation that in my device a much larger quantity of good beverage may be produced from a given quantity of coffee ground, as compared with the volume of beverage produced from the same quantity of coffee ground in other machines. I accomplished this gain by providing a partial vacuum within the beverage vessel and by uniformly maintaining such a vacuum throughout the entire operation period, and until it is finished.

In order to more clearly point out the various structural details of my device, reference is being had to the accompanying drawing in which:

Figure 1 is a vertical cross sectional view through one of the presently preferred forms of my device, and Figure 2 is a similar vertical cross sectional view through a modification of my device.

In the drawing, numeral 10 denotes the base of my coffee urn upon which is mounted an outer, warming vessel 11, which latter is preferably provided with inlet and outlet connections 12 and 13, respectively, for facilitating the replenishing of the warming liquid, such as hot water, contained in the vessel. Within the outer vessel there is suspended or otherwise fastened an inner vessel which is intended to contain the finished beverage. This inner vessel, marked 14, is preferably made of refractory material and is so constructed that its bottom is sharply inclined as shown at the 15. At the lowermost end of the vessel bottom there is provided an outlet 16, to which is connected a cock or other suitable closing means 17. Outlet pipe 16 is preferably threaded and to its threaded portion, to which cock 17 is attached, are secured suitable flanges between which packings 18 are placed so as to produce a water-tight joint between the inner and outer vessels.

Straddling the upper edge of inner vessel 14, and resting upon gasket or packing 19, made of metal or other material, is a sealing and seating ring 20 of a substantially I-shaped cross section. Its annular, horizontally disposed recessed portions of the ring are designed to accommodate not only sealing glands, gaskets or packings, such as gasket 19 disposed in the lower ring recess, but to provide register guides for the component parts of the device, as will become presently evident. This sealing ring is preferably made of metal and is provided with one or more through passages 21, which establishes communication between the interior vessel 14 and the atmosphere.

Within the annular upper recess of ring 20 there is lodged a gasket 22. On top of the ring is arranged a filter vessel 23, which is provided with a specially designed supporting ledge 24, corresponding in shape to the upper recess of ring 20. This supporting ledge is so constructed that a portion thereof rests against packing 22 so as to form an airtight connection between ring 20 and filter vessel 23. The latter is provided with a funnel-shaped bottom 25, from which extends downwards a cylindrical outlet 26. In this outlet there is operatively lodged a valve or shutter 27, which may be actuated by a suitable handle 28, extending outside of filter vessel 23.

It is to be noted that the bottom end of outlet 26 is disposed substantially below suction passages 21 provided through the body of ring 20, which arrangement is of considerable importance in respect to the correct operation of the device, as will be explained below.

Above sloping bottom 25 of the filter vessel there is seated a screen or strainer 29, which is preferably removable and which forms a support for removable and exchangeable filter 30, which latter may be made of either filter paper or filter cloth, and which I preferably so construct as to completely fill the area within the filter vessel up to its wall. Filter 30 is intended to support the material from which the beverage is to be produced, such as coffee ground or tea leaves. It is essential that no liquid is permitted to pass into beverage vessel 14 without having penetrated the coffee ground indicated at 31.

For the purpose of preventing foreign objects from entering the filter vessel I preferably provide a removable cover 32 on top of the vessel, equipped with perforations 33.

Referring now again to sealing or seating ring 20, and especially to its passages 21, it will be observed that in these passages are secured conduits 34 to which are attached, exteriorly of the urn, siphon device 35 intended to be operated by water under normal pressure of the usual water system available. These siphon devices are provided with an intake port 36, which is equipped with a valve 37, by means of which the water supply may be regulated or completely shut off. At the lower end of the siphons are outlets 38 leading to the usual waste pipes.

It will be observed that the filter vessel 23 is provided with side lugs 39, to which are hingedly secured clamping devices 40, the lower, adjustable ends of which being adapted to engage brackets 41 extending from the outer vessel 11. By these clamping devices the filter vessel may be forcibly pressed against gasket 22 of ring 20 so as to assure an airtight contact between the filter vessel and the beverage containing vessel 14.

A device similar to that described in connection with Fig. 1 is illustrated in Fig. 2, wherein again a base 10' is illustrated, upon which is supported outer or warming vessel 11', which latter in this case is provided with an interior ledge 42, upon which rests an annular rim 43, extending from the beverage containing vessel 14'. The latter is constructed somewhat different from the beverage containing vessel shown in Fig. 1 in that its bottom 15' is curved, but also slants towards outlet 16'. Clamping device 40' engages with its lower end the exterior face of ledge 42. In all other respects the device shown in Fig. 2 is quite similar to the one illustrated in Fig. 1.

*Operation*

In order to produce correctly a palatable and effective beverage, such as tea or coffee, it is essential that the material from which the beverage is to be made be subjected to the influence of water at or near the boiling point. It is, however, entirely improper to boil the beverage, once the essence of the material from which the beverage is being made has been even partially absorbed by the water.

In employing my device I provide for each operation period a fresh filter over strainer 29. I place upon the filter a layer of the material from which the beverage is to be made. This layer is preferably of uniform depth. Now valve 27 is closed and water at or near the boiling temperature is poured into the filter vessel, where it is held to absorb the essence of the material. Meantime the cover is placed over the filter vessel. Now valve 27 is opened and siphons 35 are put into operation. It is to be noted of course that cock 17 must be closed before valve 27 is opened. Siphons 35 will create a partial rarification of the atmosphere within beverage container 14 and will uniformly maintain a partial vacuum therein. Due to this vacuum formation the water placed in the filter vessel will be drawn through the coffee ground rapidly and will pass through outlet 26 of the filter bottom into vessel 14.

As stated previously, the bottom end of outlet 26 is disposed substantially below the level of suction passages 21. The reason for such arrangement is to prevent liquid passing through outlet 26 into inner vessel 14 from being drawn into passages 21 by the action of siphons 35. Thus the transfer of the beverage from the filter vessel into container 14 is accomplished without any loss.

I wish to emphasize that the partial vacuum formation is to be maintained uniformly within vessel 14 in order to achieve the proper results. This vacuum formation within the vessel must not be excessive, otherwise the water will penetrate through ground 31 too rapidly and the essence contained in the coffee will not be fully absorbed by the water. For this purpose valve 37, controlling the flow of water through siphons 35, may be adjusted or regulated until the proper degree of vacuum formation within vessel 14 is achieved. In order to be able to determine the correct vacuum within the vessel during operation, I preferably provide a connection 44 in ring 20 to which a suitable gage may be attached.

It will be found that upon proper adjustment for correct operation of the device the resulting beverage will contain just the right amount of essence, drawn from the ground or leaves on top of filter 30, and that, due to the uniformly maintained partial vacuum formation, the ground or leaves will be practically dry at the finish of each operation period. It will be also found that due to the practically complete elimination of the water from the ground, a gain of approximately 14% in effective beverage will be obtained. Thus not only a better beverage but a considerably larger volume of beverage is produced by the use of my device.

An important factor in maintaining the good quality of beverages, such as coffee and tea, will be found in the proper elimination of the residue which may cling to the interior of the vessel, and especially to its bottom. For this reason, the sloping bottom provided in my beverage vessels, and the fact that the lower-most point of the sloping bottom terminates in the outlet of the vessel, the chances of accumulating objectionable residue is practically eliminated. Furthermore the construction of the vessel with the sloping bottom permits ready cleansing and flushing of the vessel, thus minimizing the possibility of spoiling the taste of the beverage during continuous use of the device.

Conclusion

The foregoing description of the device and of the method employed in its use is primarily intended to explain the basic principles of my invention. While only two specific forms of my apparatus are illustrated, it is quite obvious that these illustrations serve merely for explanatory purposes and that I shall not be restricted to various details shown. Furthermore it is contemplated that the arrangement of the device may be altered to suit its practical application for commercial use in that, for instance, a number of my devices may be combined to form a battery of units which may be successively operated and which may be conveniently connected with one another so that, for example, the warming vessels may be alternately supplied with warming liquid or steam in order to keep the finished beverage at a proper temperature while it is being dispensed.

By the same token structural changes in the practical execution of my invention may become necessary to conform with various local regulations covering the use of devices of this kind, and I therefore reserve for myself the right to make such changes and improvements as may be found practicable or may be required in the manufacture of my device, all without departing from the broad scope of my invention, as expressed in the annexed claims.

I claim:

1. In a beverage-making device, a beverage-containing vessel with an inclined bottom terminating at its lowermost point in a closable outlet for the vessel, an outer warming vessel wherein the first vessel is suspended, a removable sealing ring seated upon the upper edge of said beverage-containing vessel, a filter vessel seated upon the sealing ring, a passage through said sealing ring, and a vacuum-forming device secured to said passage and intended to uniformly maintain a partial vacuum within the beverage-containing vessel, said filter vessel having a depending outlet extending substantially below said passage.

2. In a beverage-making device, an outer warming vessel, an inner beverage vessel suspended in the warming vessel, a filter vessel arranged above the beverage vessel, a removable sealing ring, having upper and lower gaskets, interposed between the filter and beverage vessels, means for forcibly holding these vessels and the ring against one another, thereby providing airtight connections between the three parts, said beverage vessel having an inclined bottom and an outlet at its lowermost point, said filter vessel having a depending outlet provided with a control valve, passages provided in said ring and disposed substantially above the outlet of said filter vessel, and means connected with said passages for providing and uniformly maintaining a partial vacuum in said beverage vessel.

3. In a beverage-making device, as set forth in claim 2, said sealing ring being provided with annular lower and upper recesses in which are fitted said gaskets, the upper end of the beverage vessel and the lower end of the filter vessel being designed to register with said ring recesses and engage the gaskets therein.

4. In a beverage-making device, an outer warming vessel, a refractory inner vessel for containing beverage, a filter vessel superimposed upon said inner vessel, a removable sealing ring interposed between the filter and inner vessels, said ring having upper and lower annular recesses, gaskets in the recesses, the upper edge of the inner vessel and the lower surface of the filter vessel being constructed and arranged to register with the recesses of the ring and to bear against the gaskets, the filter vessel having a funnel-shaped bottom terminating in a central, tubular extension depending into said ring and provided with a regulating valve, suction passages extending through the body of the sealing ring, said passages being disposed substantially above the bottom end of said tubular extension.

5. In a beverage-making device, as set forth in claim 4, said filter vessel having a strainer arranged above and spaced from the funnel-shaped bottom of said vessel.

6. In a beverage-making device, an outer warming vessel, an inner beverage containing vessel of refractory material and having an inclined bottom, a removable sealing ring, having upper and lower recesses provided with packing material, superimposed upon the upper edge of the inner vessel, a filter vessel seated upon the ring, the recesses of the ring serving as guide means for the inner and filter vessels, means arranged with the filter and outer vessels for urging the filter and inner vessels into sealing contact with the ring packings, said filter vessel having a cone-shaped bottom and a removable strainer disposed above and being spaced from the latter, a tubular, controllable outlet extending from the lowermost point of the bottom of the filter vessel, suction passages, connected with exterior suction means, arranged in the body of the sealing ring, the end of said tubular outlet being located substantially below said passages to prevent beverage entering through said outlet into the inner vessel from being drawn into said suction passages.

JOSEPH B. DUCAT.